United States Patent
Jung

(10) Patent No.: US 10,513,627 B2
(45) Date of Patent: Dec. 24, 2019

(54) WINDOW, DISPLAY DEVICE INCLUDING THE SAME, AND MANUFACTURING METHOD OF WINDOW

(71) Applicant: Samsung Display Co., Ltd., Yongin-si, Gyeonggi-do (KR)

(72) Inventor: Ji Yun Jung, Seoul (KR)

(73) Assignee: Samsung Display Co., Ltd. (KR)

( * ) Notice: Subject to any disclaimer, the term of this patent is extended or adjusted under 35 U.S.C. 154(b) by 219 days.

(21) Appl. No.: 15/617,991

(22) Filed: Jun. 8, 2017

(65) Prior Publication Data

US 2018/0010010 A1 Jan. 11, 2018

(30) Foreign Application Priority Data

Jul. 6, 2016 (KR) .................. 10-2016-0085422

(51) Int. Cl.
*B32B 7/02* (2019.01)
*C09D 133/14* (2006.01)
*B05D 1/18* (2006.01)
*B05D 3/06* (2006.01)

(52) U.S. Cl.
CPC ............. *C09D 133/14* (2013.01); *B05D 1/18* (2013.01); *B05D 3/067* (2013.01)

(58) Field of Classification Search
CPC ......... C09D 133/14; C08L 33/14; G02B 1/14; G02B 1/18
See application file for complete search history.

(56) References Cited

FOREIGN PATENT DOCUMENTS

| JP | 2011-072881 A | 4/2011 |
| JP | 2014-141593 A | 8/2014 |
| KR | 10-2012-0079717 A | 7/2012 |
| KR | 10-2014-0003120 A | 1/2014 |

*Primary Examiner* — Prashant J Khatri
*Assistant Examiner* — Zachary M Davis
(74) *Attorney, Agent, or Firm* — Innovations Counsel LLP

(57) ABSTRACT

A window according to an exemplary embodiment of the present disclosure includes: a substrate; and a protective layer provided in one side of the substrate, wherein the protective layer includes at least one of a first compound represented as given in Chemical Formula 1 and a derivative thereof and at least one of a second compound represented as given in Chemical Formula 2 and a derivative thereof:

Chemical Formula 1

$$H_3C\text{-}S\text{-}R_1\text{-}\underset{\underset{O}{\|}}{C}\text{-}\underset{H}{N}\text{-}\underset{R_2}{\overset{CH}{C}}\text{-}O\text{-}\underset{\underset{O}{\|}}{C}\text{-}\underset{\|}{C}\text{-}\underset{H}{C}\text{-}CH_3$$

Chemical Formula 2

$$H_2C\text{=}\underset{X}{\overset{|}{C}}\text{-}\underset{\|}{\overset{O}{C}}\text{-}Y\text{-}(R_7\text{-}Z)_m\text{-}R_8\text{-}R_9.$$

18 Claims, 2 Drawing Sheets

WINDOW, DISPLAY DEVICE INCLUDING THE SAME, AND MANUFACTURING METHOD OF WINDOW

CROSS-REFERENCE TO RELATED APPLICATION

This application claims priority to and the benefit of Korean Patent Application No. 10-2016-0085422 filed in the Korean Intellectual Property Office on Jul. 6, 2016, the entire contents of which are incorporated herein by reference.

BACKGROUND

(a) Technical Field

The present disclosure relates to a window, a display device including the window, and a method for manufacturing a window.

(b) Description of the Related Art

Today, an increasing number of devices are equipped with a display that performs visual processing, in part due to development of various multimedia environments. Displays are used in various applications ranging from a large-sized device such as a desktop computer, a digital television, and the like to a small-sized device such as a PMP terminal, a mobile phone terminal, and the like.

A small-sized display equipped in a small-sized terminal such as a DMB terminal, a PMP terminal, a mobile phone terminal, and the like is used in an environment that is different from an environment where a display is equipped in a large-sized device.

Specifically, the large-sized display is generally located at a fixed location in a given space, and thus the display stays in the same place unless there is a particular reason to move. Accordingly, less external impact such as a touch from a user is applied. In contrast, a small-sized display is mainly used in a mobile phone terminal, and thus it is frequently touched and carried by a user and is exposed to an external impact (for example, it may be dropped).

Thus, the small-sized display is generally covered by a display protective window such as tempered glass, tempered plastic, and the like so as to protect the display from the external impact. In reality of usage of such a mobile phone terminal that includes a display protective window, touch by a user frequently takes place. When the terminal is frequently touched by a user, a fingerprint of the user remains on the display protective window, and thus the display protective window becomes dirty because the fingerprint is not wiped away.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a window having excellent hardness and anti-fingerprint function, a display including the same, and a window manufacturing method.

A window according to an exemplary embodiment of the present disclosure includes: a substrate; and a protective layer on one side of the substrate, wherein the protective layer comprises at least one of a first compound represented as given in Chemical Formula 1 and a derivative thereof and at least one of a second compound represented as given in Chemical Formula 2 and a derivative thereof:

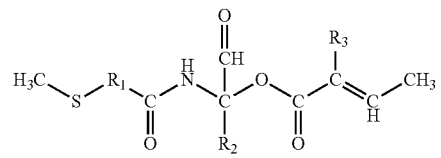

Chemical Formula 1

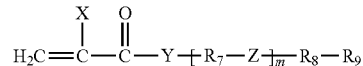

Chemical Formula 2 in Chemical Formula 1, $R_1$ denotes a C1 to C3 alkylene group or Chemical Formula 1-a, $R_2$ denotes a C1 to C3 alkyl group or Chemical Formula 1-b, and $R_3$ denotes a C1 to C3 alkyl group or Chemical Formula 1-c, in Chemical Formula 2, X denotes hydrogen or a methyl group, Y denotes —O— or —NH—, Z denotes —S— or —$SO_2$—, each of $R_7$ and $R_8$ independently denotes a substituted or unsubstituted C1 to C20 alkylene group, R9 denotes a C1 to C12 fluoroalkyl group, and m denotes an integer between 0 and 2, inclusive,

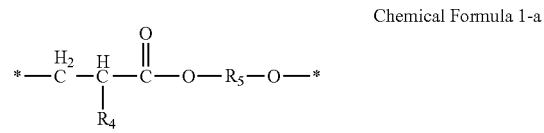

Chemical Formula 1-a

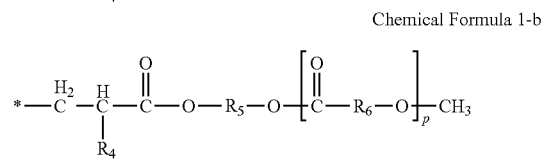

Chemical Formula 1-b

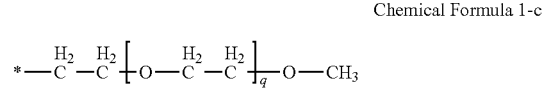

Chemical Formula 1-c in Chemical Formula 1-a and Chemical Formula 1-b, $R_4$ denotes hydrogen or a C1 to C3 alkyl group, R5 denotes a substituted or unsubstituted C1 to C30 alkylene group, and p denotes an integer between 1 and 10, inclusive, and in Chemical Formula 1-c, q denotes an integer between 1 and 10, inclusive.

The protective layer may include a first area and a second area, the first area may be provided closer to the substrate than the second area, and the first area may include a hard coating component, and the second area includes an anti-fingerprint component.

The hard coating component may include at least one of the first compound and a derivative of the first compound, and the anti-fingerprint component may include at least one of the second compound and a derivative of the second compound.

A thickness of the second area may be thinner than a thickness of the first area.

In Chemical Formula 1-a and Chemical formula 1-b, $R_5$ may be one selected from the group consisting of a methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

In Chemical Formula 2, $R_7$ and $R_8$ may each be selected from a group including a methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

Pencil hardness of the protective window may be greater than or equal to 1H and a contact angle is greater than or equal to 105 degrees.

A display device according to another exemplary embodiment of the present disclosure includes a substrate and a protective layer provided on one side of the substrate, and the protective layer is formed from a first compound represented as given in Chemical Formula 1 and a second compound represented as given in Chemical Formula 2.

According to another exemplary embodiment of the present disclosure, a method for manufacturing a window is provided. The method includes: coating a protective material on at least one side of opposite sides of a substrate; and forming a protective layer by curing the coated protective material, wherein the coating of the protective material uses a one-liquid type solution that includes a hard coating component and an anti-fingerprint component.

The method may further include drying the protective layer before the curing of the protective material.

The curing the protective material may include irradiating ultraviolet rays to the substrate.

The coating of the protective material may include immersing the substrate in the one-liquid type solution.

The hard coating component may be a compound represented as given in Chemical Formula 1, and the anti-fingerprint component may be a compound represented as given in Chemical Formula 2.

The one-liquid type solution may include a polar solvent.

The polar solvent may include at least one selected from the group consisting of isopropyl alcohol, dimethyl sulfoxide (DMSO), dimethyl formamide (DMF), N-methyl-2-pyrrolidinone (NMP), ethylene glycol (EG), propylene glycol methyl ether, 2-bytanone, 4-methyl-2-pentanone, ethyl cellosolve, methyl cellosolve, methyl alcohol, isobutyl alcohol, t-butyl alcohol, benzyl alcohol, and di-acetone alcohol.

The coating of the protective material may include movement of the anti-fingerprint component in a direction that is away from the substrate.

The anti-fingerprint component may be included at a content of 0.01 wt % to 10 wt % in a content that includes the hard coating component and the anti-fingerprint component.

According to the exemplary embodiments of the present disclosure, a window is formed by using a one-liquid type solution that includes a hard coating component and an anti-fingerprint component so that a manufacturing process can be simplified and hardness and anti-fingerprint performance of the window can be improved.

DETAILED DESCRIPTION OF THE EMBODIMENTS

Figure 1:
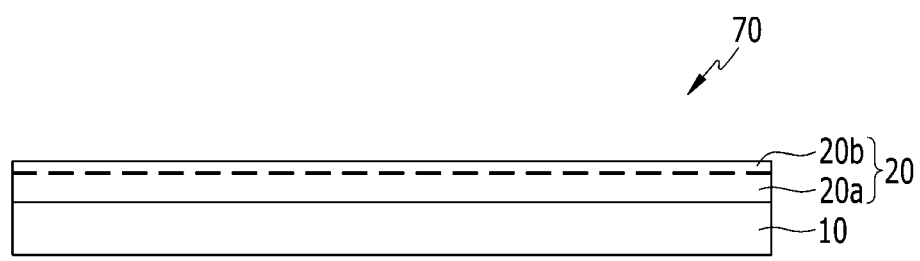
FIG. 1 is a cross-sectional view of a window according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity. In the drawings, for better understanding and ease of description, the thickness of some layers and areas is exaggerated.

It will be understood that when an element such as a layer, film, region, or substrate is referred to as being "on" another element, it can be directly on the other element or intervening elements may be present. In contrast, when an element is referred to as being "directly on" another element, there are no intervening elements present. Further, when an element is referred to as being "above" or "on" a reference element, it can be positioned above or below the reference element, and it is not necessarily positioned "above" or "on" in a direction opposite to gravity.

In addition, unless explicitly described to the contrary, the word "comprise" and variations such as "comprises" or "comprising" will be understood to imply the inclusion of stated elements but not the exclusion of any other elements.

Further, in this specification, the word "on a plane" means viewing a target portion from the top, and the word "on a cross-section" means viewing a cross-section formed by vertically cutting a target portion from the side.

In the present specification, if there is no particular mention to the contrary, the term "substituted" means that at least one hydrogen atom is substituted by a substituent group of a halogen atom (F, Cl, Br, or I), a hydroxy group, a C1 to C20 alkoxy group, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

Further, unless particularly mentioned in the present specification, the term "hetero" means that at least one hetero atom of N, O, S, and P is included in a cyclic group.

Further, unless particularly mentioned in the present specification, the term "alicyclic" means a C3 to C40 cycloalkyl, a C3 to C40 cycloalkenyl, a C3 to C40 cycloalkynyl, a C3 to C40 cycloalkylene, a C3 to C40 cycloalkenylene, or a C3 to C40 cycloalkynylene, and specifically means a C3 to C20 cycloalkyl, a C3 to C20 cycloalkenyl, a C3 to C20 cycloalkynyl, a C3 to C20 cycloalkylene, a C3 to C20 cycloalkenylene, or a C3 to C20 cycloalkynylene, and the term "aromatic" means a C6 to C40 aryl, a C2 to C40 heteroaryl, a C6 to C40 arylene, or a C2 to C40 heteroarylene, and specifically means a C6 to C16 aryl, a C2 to C16 heteroaryl, a C6 to C16 arylene, or a C2 to C16 heteroarylene.

Further, unless particularly mentioned in the present specification, the term "combination" generally means mixing or copolymerization, and means that in an alicyclic organic group and an aromatic organic group, two or more cycles form a fused cycle or two or more cycles are connected to each other by a functional group of a single bond, —O—, —S—, —C(=O)—, —CH(OH)—, —S(=O)—, —S(=O)$_2$—, —Si(CH$_3$)$_2$—, —(CH$_2$)p— (herein, 1≤p≤2), —(CF$_2$)q— (herein, 1≤q≤2), —C(CH$_3$)$_2$—, —CH(CH$_3$)—, —C(CF$_3$)$_2$—, —CH(CF$_3$)—, or —C(=O) NH—. Herein, the term "copolymerization" means block copolymerization or random copolymerization, and the term "copolymer" means a block copolymer or a random copolymer.

FIG. 1 is a cross-sectional view of a window according to an exemplary embodiment of the present disclosure.

Referring to FIG. 1, a window 70 according to the present exemplary embodiment includes a substrate 10 and a protective layer 20 provided on the substrate 10. The substrate 10 includes transparent plastic or transparent glass. Specifically, the substrate 10 may be one or more selected from the group consisting of triacetyl cellulose (TAC), polyethylene terephthalate (PET), polyethylene naphthalate (PEN), polycarbonate (PC), and a norbornene-based polymer, but this is not restrictive.

The protective layer 20 according to the present exemplary embodiment includes a hard-coating component and an anti-fingerprint component. The hard-coating component may include at least one of a first compound represented as given in Chemical Formula 1 and a derivative of the first compound, and the anti-fingerprint component may include at least one of a second compound represented as given in Chemical Formula 2 and a derivative of the second compound.

Chemical Formula 1

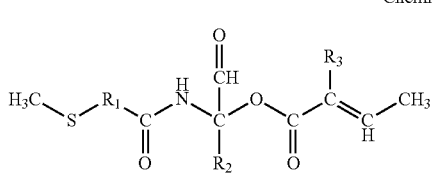

Chemical Formula 2

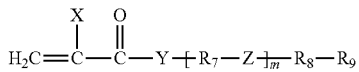

In Chemical Formula 1, $R_1$ denotes a C1 to C3 alkylene group or Chemical Formula 1-a, $R_2$ denotes a C1 to C3 alkyl group or Chemical Formula 1-b, and R3 denotes a C1 to C3 alkyl group or Chemical Formula 1-c, in Chemical Formula 2, X denotes hydrogen or a methyl group, Y denotes —O— or —NH—, Z denotes —S— or —SO$_2$—, $R_7$ and $R_8$ independently denote a substituted or unsubstituted C1 to C20 alkyl group, $R_9$ denotes a C1 to C12 fluoroalkyl group, and m denotes an integer between 0 and 2, inclusive, Chemical Formula 1-a

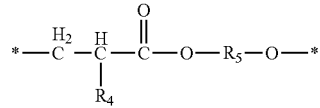

Chemical Formula 1-b

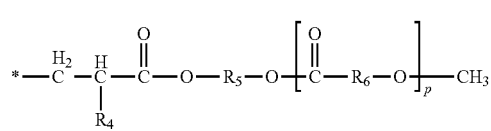

Chemical Formula 1-c

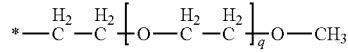

in Chemical Formula 1-a and Chemical Formula 1-b, $R_4$ denotes hydrogen or a C1 to C3 alkyl group, $R_5$ denotes a substituted or unsubstituted C1 to C30 alkylene group, and p denotes an integer between 1 and 10, inclusive, and in Chemical Formula 1-c, q denotes an integer between 1 and 10, inclusive.

"*" in Chemical Formula 1-a, Chemical Formula 1-b, and Chemical Formula 1-c respectively mean locations where groups respectively represented as given in Chemical Formula 1-a, Chemical Formula 1-b, and Chemical Formula 1-c are coupled with other groups in the structural formula of Chemical Formula 1.

The protective layer 20 is formed from a first compound represented as given in Chemical Formula 1 and a second compound represented as given in Chemical Formula 2. In the present exemplary embodiment, a derivative of the first compound and a derivative of the second compound indicate that polymerization of the first compound and the second compound occurs due to irradiation of ultraviolet rays such that the first compound and the second compound are cross-linked, and accordingly, chemical structures are changed from Chemical Formula 1 and Chemical Formula 2.

The protective layer 20 includes a first area 20a provided on the substrate 10 and a second area 20b disposed on an upper portion of the first area 20a. A thickness of the second area 20b may be smaller than a thickness of the first area 20a. When the second area 20b is coated thickly, tactile impression becomes glossy, thereby causing an unpleasant feeling.

The first area 20a may include a hard coating component, and the second area 20b may include an anti-fingerprint component. In the protective layer 20, although the hard coating component that includes a first compound and a derivative of the first compound and the anti-fingerprint component that includes a second compound and a derivative of the second compound are not distinctive layers defined by phase separation, the first compound and the derivative of the first compound are mostly provided in the first area 20a and the second compound and the derivative of the second compound are mostly provided in the second area 20b. For example, the first compound and the derivative of the first compound have a gradient with the highest concentration being closer to the substrate 10, and the second compound and the second derivative of the second compound have a gradient of increasing concentration with distance from the substrate 10.

In a process of forming the protective layer 20, the second compound 20 mostly moves to the surface of the window 70 because the second compound 20 including a fluoroalkyl group has lower surface energy. Thus, as shown in FIG. 1, the first compound and the derivative of the first compound are mostly provided in the first area 20a which is close to the substrate 10, and the second compound and the derivative of the second compound are mostly provided in the second area 20b.

A pencil hardness of the protective layer 20 according to the present exemplary embodiment is greater than or equal to about 1H and a contact angle thereof may be greater than or equal to about 105 degrees, and preferably, the pencil hardness may be between about 1H and about 4H and the contact angle may be between about 105 degrees and about 115 degrees.

The protective layer 20 according to the present exemplary embodiment includes the fluoroalkyl group and thus not only has low surface energy but also has a low refractive index, and accordingly, the protective layer 20 may provide a water repellency property, an oil repellency property, and an anti-contamination property, which is a feature such that it cannot be easily contaminated. Further, since the protective layer 20 includes the hard coating component, the protective layer 20 may also provide an anti-scratch property and an abrasion resistance property.

It is preferred that the fluoroalkyl group included in the second compound includes 1 to 12 carbon atoms. When the number of carbon atoms included in the fluoroalkyl group exceeds 12, the surface of the protective layer 20 may become oily.

In the above-stated Chemical Formula 1-a and Chemical Formula 1-b, $R_5$ may be one selected from the group consisting of a methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

In Chemical Formula 2, $R_7$ and $R_8$ may each be one selected from the group consisting of a methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

Chemical Formula 1 may be represented as one of Chemical Formula A-1 to Chemical Formula A-25.

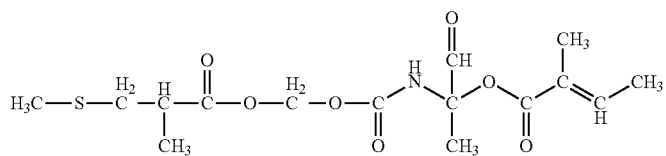

Chemical Formula A-1

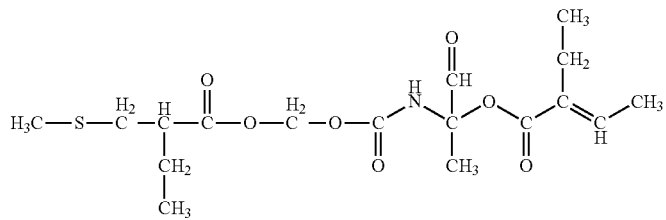

Chemical Formula A-2

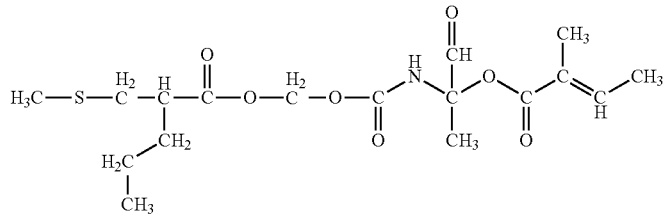

Chemical Formula A-3

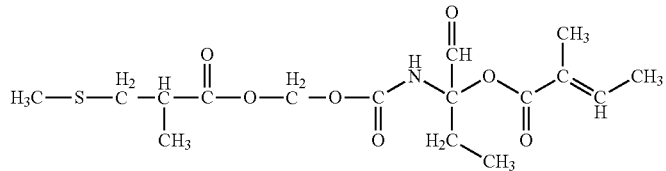

Chemical Formula A-4

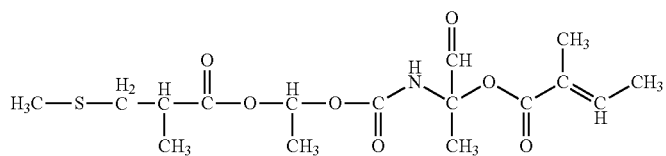

Chemical Formula A-5

-continued
Chemical Formula A-6
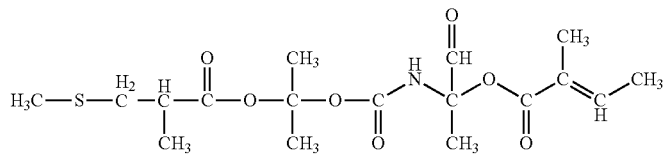
Chemical Formula A-7
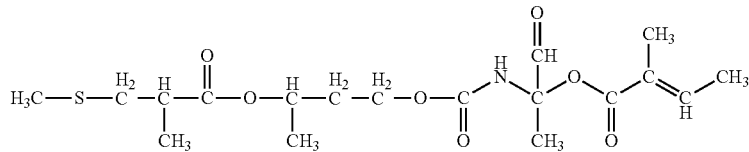
Chemical Formula A-8
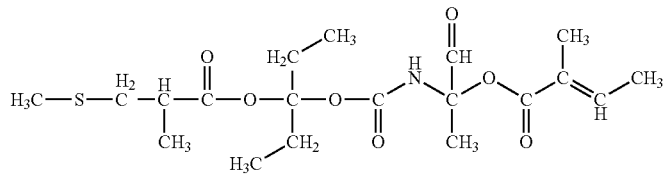
Chemical Formula A-9
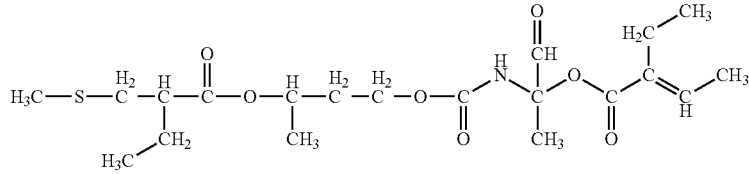
Chemical Formula A-10
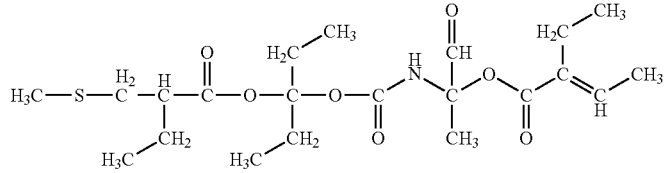
Chemical Formula A-11
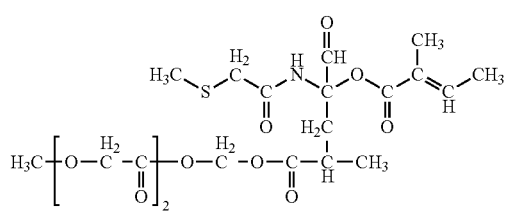
Chemical Formula A-12
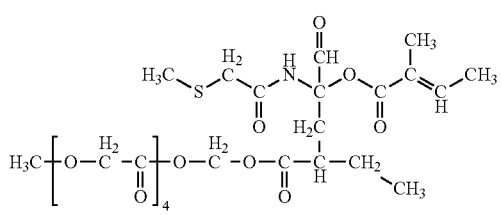
Chemical Formula A-13
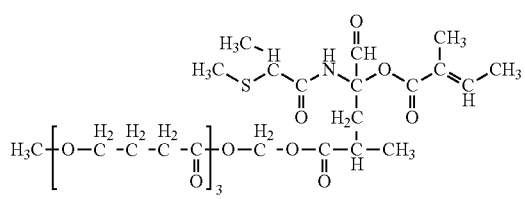
Chemical Formula A-14
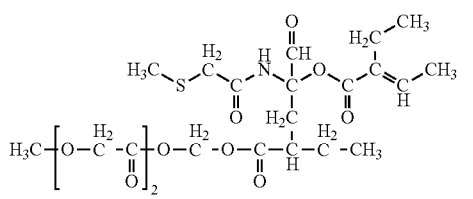
Chemical Formula A-15
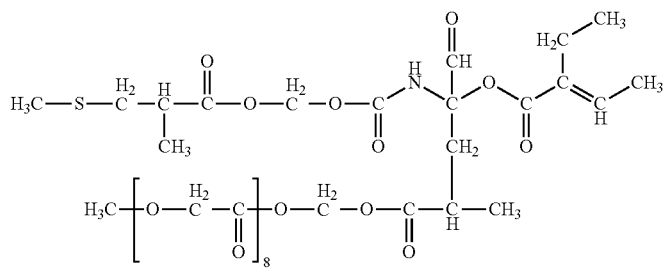

-continued
Chemical Formula A-16
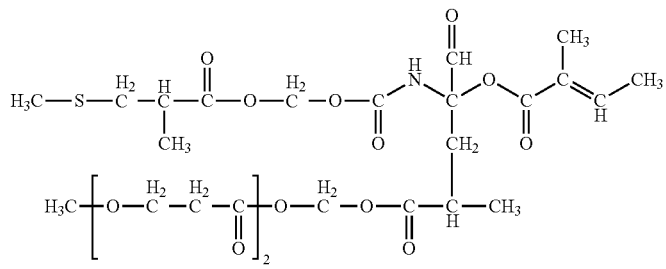
Chemical Formula A-17
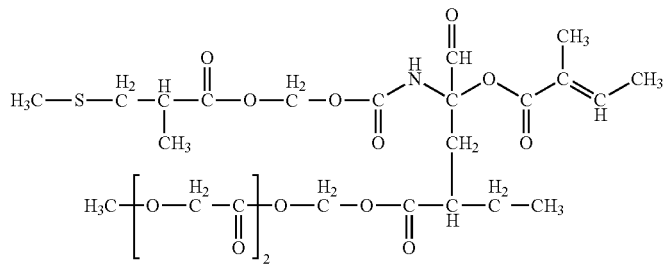
Chemical Formula A-18
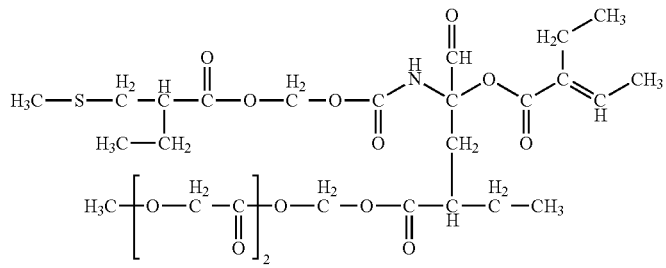
Chemical Formula A-19
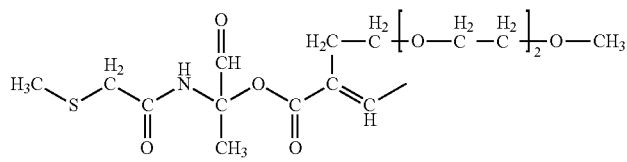
Chemical Formula A-20
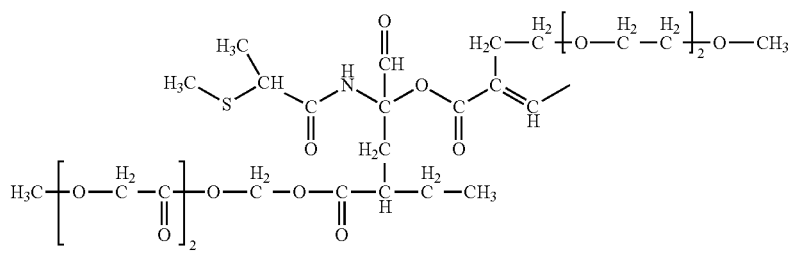
Chemical Formula A-21
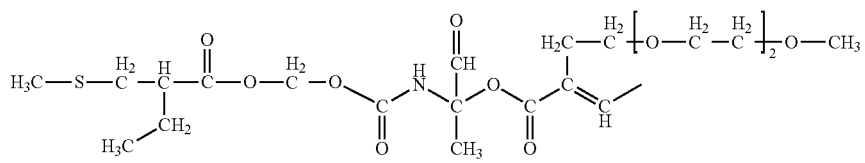

Chemical Formula A-22
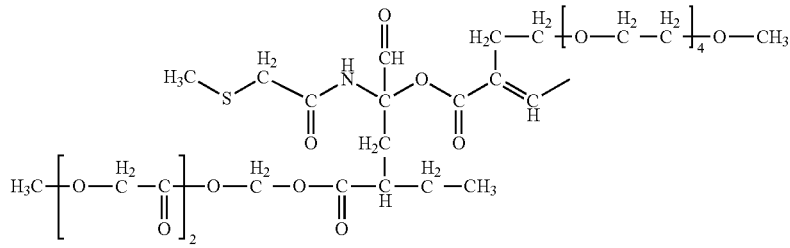
Chemical Formula A-23
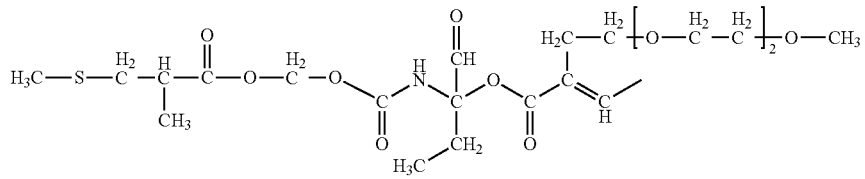
Chemical Formula A-24
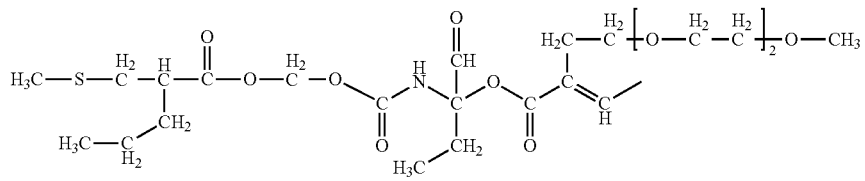
Chemical Formula A-25
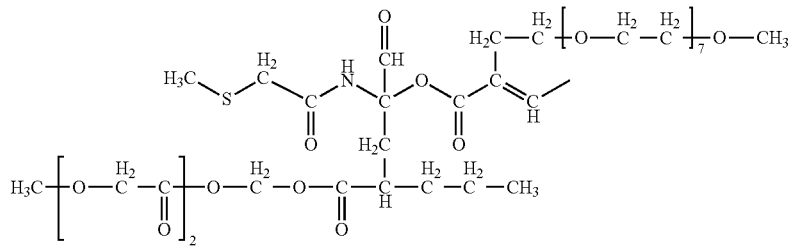
Chemical Formula 2 may be represented as one of Chemical Formula B-1 to Chemical Formula B-12.
Chemical Formula B-1
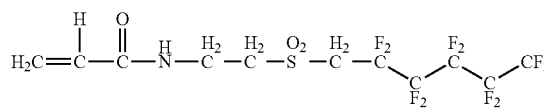
Chemical Formula B-2
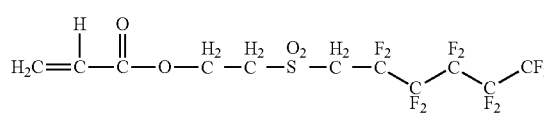
Chemical Formula B-3
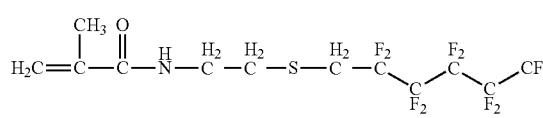
Chemical Formula B-4
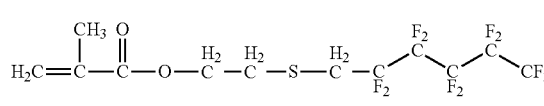
-continued
Chemical Formula B-5
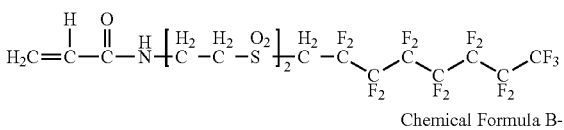
Chemical Formula B-6
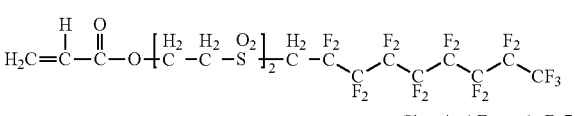
Chemical Formula B-7
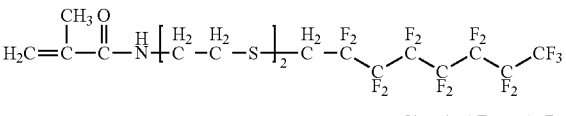
Chemical Formula B-8
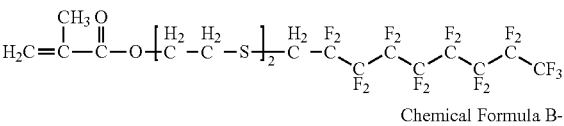
Chemical Formula B-9
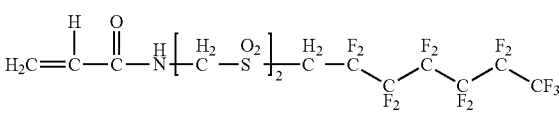

-continued

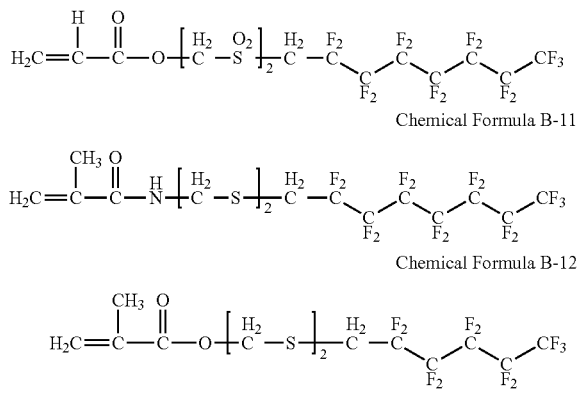

Chemical Formula B-10

Chemical Formula B-11

Chemical Formula B-12

Figure 2:
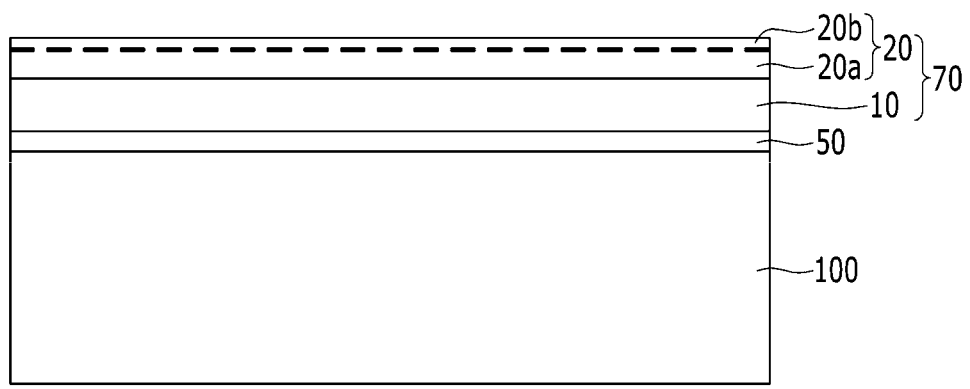
FIG. 2 is a cross-sectional view of a display device including the window according to the exemplary embodiment of the present disclosure.

FIG. 2 is a cross-sectional view of a display device including the window according to the exemplary embodiment of the present disclosure.

The window 70 according to the above-described exemplary embodiment may be applied to various display devices. Referring to FIG. 2, the display panel 100 and the window 70 may be bonded to each other by an adhesive layer 50. However, such bonding is one of exemplary methods, and the display panel 100 and the window 70 can be combined with each other by various methods.

The adhesive layer 50 may be a pressure sensitive adhesive (PSA) layer or an optically clear adhesive (OCA) layer.

The display panel 100 is a panel for forming a liquid crystal display (LCD), an organic light emitting diode (OLED) display, a plasma display, an electric field effect display device, an electrophoretic display, and the like, but the present disclosure is not limited thereto.

Hereinafter, a method for manufacturing the above-described window will be exemplarily described with reference to FIG. 3.

Figure 3:
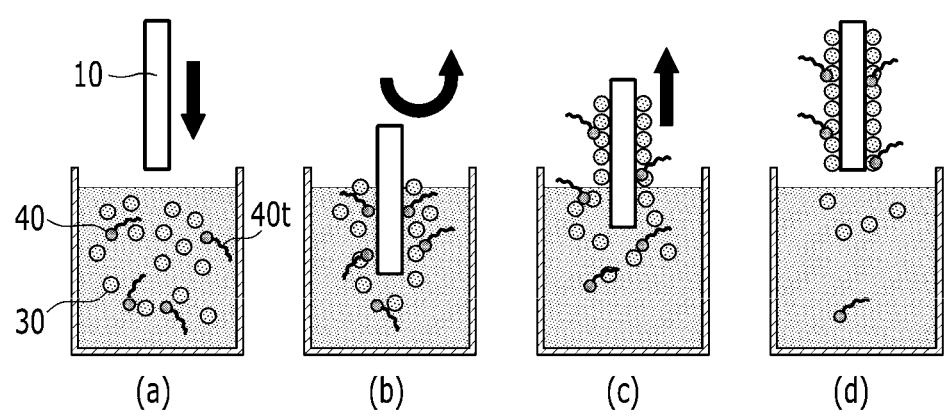
FIG. 3 schematically shows a method for manufacturing a window according to an exemplary embodiment of the present disclosure.

FIG. 3 schematically shows a window manufacturing method according to an exemplary embodiment of the present disclosure.

The window manufacturing method according to the present exemplary embodiment includes: coating a protective material on at least one side of opposite sides of a transparent substrate; and forming a protective layer by curing the coated protective material, and when the protective material is coated, a one-liquid type solution that includes both of a hard coating component and an anti-fingerprint component is used.

Referring to FIG. 3 (*a*), the substrate 10 may be immersed in an immersion tank including the one-liquid type solution that includes a first compound 30 represented as given in Chemical Formula 1 and a second compound 40 represented as given in Chemical Formula 2. The second compound 40 includes a fluoroalkyl group 40*t*, which is included in Chemical Formula 2.

The one-liquid type solution according to the present exemplary embodiment may include a polar solvent. The polar solvent may include at least one selected from the group consisting of isopropyl alcohol, dimethyl sulfoxide (DMSO), dimethyl formamide (DMF), N-methyl-2-pyrrolidinone (NMP), ethylene glycol (EG), propylene glycol methyl ether, 2-butanone, 4-methyl-2-pentanone, ethyl cellosolve, methyl cellosolve, methyl alcohol, isobutyl alcohol, t-butyl alcohol, benzyl alcohol, and di-acetone alcohol.

The one-liquid type solution may include a photo-initiator for curing through irradiation of ultraviolet (UV) rays, which will be described later. The photo-initiator may include at least one selected from the group consisting of a benzoin ether, a substituted benzoin ether, a substituted acetophenone, a substituted α-ketol, an aromatic sulfonyl chloride, a photoactive oxime, benzoin methyl ether, benzoin isopropyl ether, anisole methylether, 2,2-diethoxyacetophenone, 2,2-dimethoxy-2-phenylacetophenone, 1-hydroxy-cyclohexyl-phenyl-ketone, 2-methyl-2-hydroxy propiophenone, 2-naphthalene sulfonyl chloride, and 1-phenyl-1,1-propanedione-2-(o-ethoxycarbonyl)-oxime.

Referring to FIG. 3 (*b*), the first compound 30 and the second compound 40 are coated on at least one of the opposite sides of the immersed substrate 10. The first compound 30 and the second compound 40 are protective materials for forming a protective layer at the surface of the substrate 10. The first compound 30 is a hard coating component and the second component 40 is an anti-fingerprint component, and the second compound 40 may be included in a content of about 0.01 wt % to about 10 wt % in a solid content including the first and second compounds 30 and 40.

Referring to FIG. 3 (*c*) and FIG. 3 (*d*), when the substrate 10 is taken out from the immersion tank, the first compound 30 and the second compound 40 are respectively coated on the opposite sides of the substrate 10, and a fluoroalkyl group 40*t* of the second compound 40 may be stretched in a direction that is substantially perpendicular to one side of the substrate 10. The second compound 40, which is an anti-fingerprint component, includes the fluoroalkyl group 40*t*, and therefore the second compound 40 has low surface energy and thus may move to a direction that is away from the substrate 10.

In order to use the substrate 10 where the first compound 30 and the second compound 40 are coated as a window for a display device, a coating solution on one of sides of the substrate 10 may be removed. In this case, a normal pressure plasma treatment may be performed to remove the coating solution at one side of the substrate 10. The side of the substrate 10 from which the coating solution is removed and the display panel 100 of FIG. 2 may be attached to an adhesive layer 50.

As a method for immersing the substrate 10, the first and second compounds 30 and 40 are coated, but as an exemplary variation, various wet coating methods such as spin coating, spindle coating, spray coating, slit coating, and the like may be used to coat the surface of the substrate 10.

Next, a solvent of the coating solution volatilized by dry-treating the substrate 10.

Next, the coating solution is cured by irradiating ultraviolet (UV) rays such that the protective layer 20 of FIG. 1 can be formed on at least one side of the substrate 10. When the ultraviolet rays are irradiated, the first compound 30 and the second compound 40 are reacted with each other such that a polymer compound can be formed, but distribution locations of the first compound 30 and the second compound 40, described with reference to FIG. 1 are hardly changed.

As an exemplary variation of the above-stated method for coating one side of the substrate 10, one side of the substrate 10 is masked using a masking film before the substrate 10 is immersed in the immersion tank of FIG. 3 (*a*) and then the other side of the substrate 10 is coated, and then the masking film is removed after drying the substrate 10 and ultraviolet curing may be performed.

As described above, the window manufacturing method according to the present exemplary embodiment can simultaneously realize hard coating and anti-finger printing functions by using the one-liquid type solution so that the manufacturing process can be simplified into one step.

Synthetic Example of Chemical Formula A-1

31.2 g of (carboxyoxy)methyl 2-methyl-3-(methylthio)propanoate, 20.3 g of 3-hydroxy-2-isocyanato-2-methyl-3 $\lambda^2$-propanel, 150 ml of toluene, and 0.3 g of triethyl amine were inserted into a three-neck flask having a rounded bottom and then stirred at 80° C. for 5 hours. Next, 25.9 g of 2-hydroxyethyl (Z)-2-methylbut-2-enoate and 0.2 g of TIN(II) OCTOATE were added and then reacted for 5 hours such that Chemical Formula A-1 (4,11-dimethyl-5,9,12-trioxo-6,8-dioxa-2-thia-10-azadodecan-11-yl (E)-2-methylbut-2-enoate) was acquired.

m/z: 361.12 (100.0%), 362.12 (16.2%), 363.12 (4.5%), 363.12 (1.4%), 363.13 (1.2%)

1H NMR (DMSO)

1.17 (3H, d), 1.85 (3H, s), 2.07 (3H, s), 2.34 (3H, s), 2.35 (3H, s), 2.65-2.90 (3H, m), 6.60 (1H, s), 6.87 (2H, s), 9.18 (1H, s), 9.72 (1H, s)

Synthetic Example of Chemical Formula B-2

25.9 g of 2-((2,2,3,3,4,4,5,5,6,6-undecafluorohexyl)sulfonyl)ethyl hypoiodite, 3.36 g of acrylaldehyde, 50 ml of toluene, and 0.03 g of tert-butylperoxypivalate were inserted into a three-neck flask having a rounded bottom and then stirred at 90° C. for 4 hours. Next, pressure-reducing filtering was performed such that a solid content was recrystallized in toluene such that 2-((2,2,3,3,4,4,5,5,6,6-undecafluorohexyl)sulfonyl)ethyl acrylate) was acquired.

m/z: 446.00 (100.0%), 447.01 (11.9%), 448.00 (4.5%)

1H NMR (DMSO)

3.69-3.71 (4H, m), 4.71 (2H, t), 5.83 (1H, d), 6.12 (1H, m), 6.41 (1H, d)

Comparative Example

As a hard coating component and an anti-fingerprint component, AC601 (Arakawa Co., Ltd) and RS-503 (DIC co., Ltd.) were blended at a weight ratio of 99:1.

Exemplary Embodiment 1 to Exemplary Embodiment 15

The one-component type of hard coating solution according to the present exemplary embodiment was coated using a dip coating method on a 1.0 T plastic substrate, the substrate was dried at 80° C. for 5 minutes, and then the one-component type of hard coating solution was cured through UV irradiation. Next, for a hardness test, pencil hardness was measured at 250 gf with a speed of 60 mm/s, and a contact angle (DI water) was measured for a fingerprint resistance test.

Table 1 show contact angles and pencil hardness variations according to exemplary embodiments of the present disclosure compared to a comparative example.

TABLE 1

| | Hard coating component | Anti-fingerprint component | Use ratio (wt %) | Contact angle (degrees) | Pencil hardness |
|---|---|---|---|---|---|
| Comparative Example | AC601 (Arakawa Co., Ltd) | RS-503 (DIC Co., Ltd.) | 99:1 | 74.9 | 2B |
| Exemplary Embodiment 1 | A-1 | B-1 | 99:1 | 107.0 | 1H |
| Exemplary Embodiment 2 | A-1 | B-3 | 99.5:0.5 | 107.7 | 3H |
| Exemplary Embodiment 3 | A-3 | B-2 | 98:2 | 109.0 | 1H |
| Exemplary Embodiment 4 | A-6 | B-5 | 99:1 | 110.0 | 3H |
| Exemplary Embodiment 5 | A-9 | B-5 | 99:1 | 109.0 | 2H |
| Exemplary Embodiment 6 | A-9 | B-7 | 99:1 | 112.0 | 1H |
| Exemplary Embodiment 7 | A-12 | B-7 | 98:2 | 112.7 | 1H |
| Exemplary Embodiment 8 | A-20 | B-7 | 98:2 | 112.3 | 3H |
| Exemplary Embodiment 9 | A-20 | B-8 | 97:3 | 114.7 | 3H |
| Exemplary Embodiment 10 | A-19 | B-8 | 99.5:0.5 | 105.8 | 1H |
| Exemplary Embodiment 11 | A-20 | B-10 | 99.5:0.5 | 106.4 | 2H |
| Exemplary Embodiment 12 | A-23 | B-10 | 97:3 | 106.0 | 1H |
| Exemplary Embodiment 13 | A-23 | B-11 | 98:2 | 108.5 | 3H |
| Exemplary Embodiment 14 | A-17 | B-7 | 98:2 | 109.0 | 2H |
| Exemplary Embodiment 15 | A-17 | B-8 | 99:1 | 108.8 | 2H |

Referring to Table 1, it can be observed that the contact angle was increased about 29% and the pencil hardness was significantly increased according to the exemplary embodiments of the present disclosure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: substrate
20: protective layer
20a: first area
20b: second area
30: first compound
40: second compound
40t: fluoroalkyl group
50: adhesive layer
70: window
100: display panel

What is claimed is:

1. A window comprising:
a substrate; and
a protective layer on one side of the substrate,
wherein the protective layer comprises at least one of a first compound represented as given in Chemical Formula 1 and a derivative thereof and at least one of a second compound represented as given Chemical Formula 2 and a derivative thereof:

Chemical Formula 1

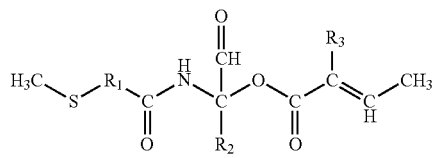

Chemical Formula 2

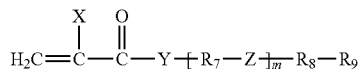

in Chemical Formula 1, $R_1$ denotes a C1 to C3 alkylene group or Chemical Formula 1-a, $R_2$ denotes a C1 to C3 alkyl group or Chemical Formula 1-b, and $R_3$ denotes a C1 to C3 alkyl group or Chemical Formula 1-c,
in Chemical Formula 2, X denotes hydrogen or a methyl group, Y denotes —O— or —NH—, Z denotes —S— or —SO$_2$—, $R_7$ and $R_8$ independently denote a substituted or unsubstituted C1 to C20 alkylene group, $R_9$ denotes a C1 to C12 fluoroalkyl group, and m denotes an integer between 0 and 2, inclusive, Chemical Formula 1-a

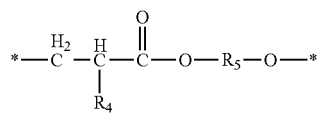

Chemical Formula 1-b

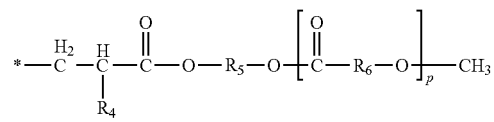

Chemical Formula 1-c

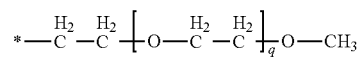

in Chemical Formula 1-a and Chemical Formula 1-b, $R_4$ denotes hydrogen or a C1 to C3 alkyl group, $R_5$ denotes a substituted or unsubstituted C1 to C30 alkylene group, and p denotes an integer between 1 and 10, inclusive, and in Chemical Formula 1-c, q denotes an integer between 1 and 10, inclusive.

2. The window of claim 1, wherein the protective layer comprises a first area and a second area, the first area is provided closer to the substrate than the second area, and the first area comprises a hard coating component, and the second area comprises an anti-fingerprint component.

3. The window of claim 2, wherein the hard coating component comprises at least one of the first compound and a derivative of the first compound, and the anti-fingerprint component comprises at least one of the second compound and a derivative of the second compound.

4. The window of claim 2, wherein a thickness of the second area is thinner than a thickness of the first area.

5. The window of claim 1, wherein in Chemical Formula 1-a and Chemical formula 1-b, $R_5$ is one selected from the group consisting of a methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

6. The window of claim 1, wherein, in Chemical Formula 2, $R_7$ and $R_8$ are each one selected from the group consisting of an methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

7. The window of claim 1, wherein pencil hardness of the protective window is greater than or equal to 1H and a contact angle is greater than or equal to 105 degrees.

8. A display device comprising a window,
wherein the window comprises
a substrate; and
a protective layer on one side of the substrate,
wherein the protective layer comprises at least one of a first compound represented as given in Chemical Formula 1 and a derivative thereof and at least one of a second compound represented as given Chemical Formula 2 and a derivative thereof:

Chemical Formula 1

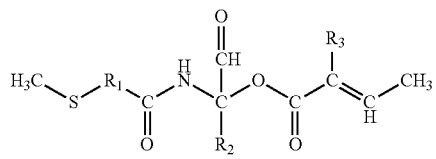

Chemical Formula 2

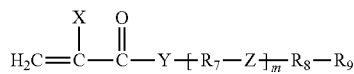

in Chemical Formula 1, R1 denotes an a C1 to C3 alkylene group or Chemical Formula 1-a, R2 denotes a C1 to C3 alkyl group or Chemical Formula 1-b, and R3 denotes a C1 to C3 alkyl group or Chemical Formula 1-c, in Chemical Formula 2, X denotes hydrogen or a methyl group, Y denotes —O— or —NH—, Z denotes —S— or —SO$_2$—, R7 and R8 independently denote a substituted or unsubstituted C1 to C20 alkylene group, R9 denotes a C1 to C12 fluoroalkyl group, and m denotes an integer between 0 and 2, inclusive, Chemical Formula 1-a

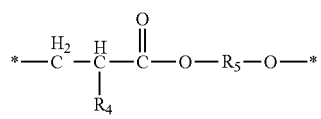

Chemical Formula 1-b

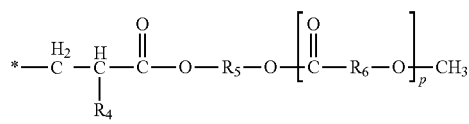

Chemical Formula 1-c

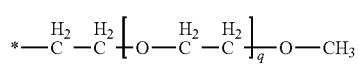

in Chemical Formula 1-a and Chemical Formula 1-b, R4 denotes hydrogen or a C1 to C3 alkyl group, R5 denotes a substituted or unsubstituted C1 to C30 alkylene group, and p denotes an integer between 1 and 10, inclusive, and in Chemical Formula 1-c, q denotes an integer between 1 and 10, inclusive.

9. A method for manufacturing a window, comprising:

coating a protective material on at least one side of a substrate; and forming a protective layer by curing the coated protective material, wherein the coating of the protective material uses a one-liquid type solution that includes a hard coating component and an anti-fingerprint component, wherein the hard coating component is a compound represented as given in Chemical Formula 1, and the anti-fingerprint component is a compound represented as given in Chemical Formula 2:

Chemical Formula 1

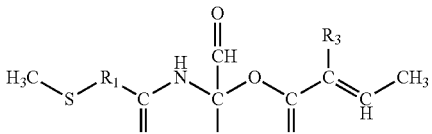

Chemical Formula 2

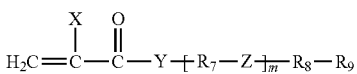

in Chemical Formula 1, $R_1$ denotes a C1 to C3 alkylene group or Chemical Formula 1-a, $R_2$ denote a C1 to C3 alkyl group or Chemical Formula 1-b, and $R_3$ denotes a C1 to C3 alkyl group or Chemical Formula 1-c, in Chemical Formula 2, X denotes hydrogen or a methyl group, Y denotes —O— or —NH—, Z denotes —S— or —SO$_2$—, $R_7$ and $R_8$ independently denote a substituted or unsubstituted C1 to C20 alkyl group, $R_9$ denotes a C1 to C12 fluoroalkyl group, and m denotes an integer between 0 and 2, inclusive, Chemical Formula 1-a

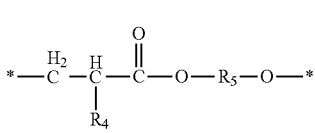

Chemical Formula 1-b

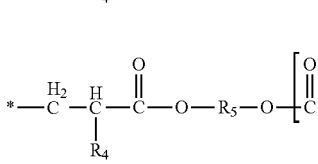

Chemical Formula 1-c

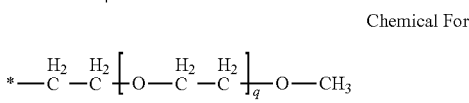

in Chemical Formula 1-a and Chemical Formula 1-b, $R_4$ denotes hydrogen or a C1 to C3 alkyl group, $R_5$ denotes a substituted or unsubstituted C1 to C30 alkylene group, and p denotes an integer between 1 and 10, inclusive, and in Chemical Formula 1-c, q denotes an integer between 1 and 10, inclusive.

10. The method for manufacturing the window of claim 9, further comprising drying the protective layer before the curing of the protective material.

11. The method for manufacturing the window of claim 10, wherein the curing the protective material comprises irradiating ultraviolet rays to the substrate.

12. The method for manufacturing the window of claim 9, wherein the coating of the protective material comprises immersing the substrate in the one-liquid type solution.

13. The method for manufacturing the window of claim 9, wherein in Chemical Formula 1-a and Chemical Formula 1-b, $R_5$ is one selected from the group consisting of a methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

14. The method for manufacturing the window of claim 9, wherein, in Chemical Formula 2, $R_7$ and $R_8$ are each one selected from the group consisting of an methylene group, an ethylene group, a propylene group, an isopropylene group, an n-butylene group, an s-butylene group, an isobutylene group, a t-butylene group, an n-pentylene group, an n-hexylene group, an n-heptylene group, and an n-octylene group.

15. The method for manufacturing the window of claim 9, wherein the one-liquid type solution comprises a polar solvent.

16. The method for manufacturing the window of claim 15, wherein
    the polar solvent comprises at least one selected from the group consisting of isopropyl alcohol, dimethyl sulfoxide (DMSO), dimethyl formamide (DMF), N-methyl-2-pyrrolidinone (NMP), ethylene glycol (EG), propylene glycol methyl ether, 2-bytanone, 4-methyl-2-pentanone, ethyl cellosolve, methyl cellosolve, methyl alcohol, isobutyl alcohol, t-butyl alcohol, benzyl alcohol, and di-acetone alcohol.

17. The method for manufacturing the window of claim 9, wherein the coating of the protective material comprises movement of the anti-fingerprint component in a direction that is away from the substrate.

18. The method for manufacturing the window of claim 9, wherein the anti-fingerprint component is included at a content of 0.01 wt % to 10 wt % in a content that includes the hard coating component and the anti-fingerprint component.

* * * * *